United States Patent [19]
Pruehs et al.

[11] Patent Number: 5,588,874
[45] Date of Patent: Dec. 31, 1996

[54] WATTHOUR METER SOCKET ADAPTER FOR REPLACING AN OB WATTHOUR METER

[75] Inventors: Allen V. Pruehs, Howell; Darrell Robinson, Highland Township; Robert O. Learmont, Walled Lake, all of Mich.

[73] Assignee: Ekstrom Industries, Inc., Farmington Hills, Mich.

[21] Appl. No.: 418,824

[22] Filed: Apr. 7, 1995

[51] Int. Cl.$^6$ ..................................................... H02B 9/00
[52] U.S. Cl. ..................... 439/517; 361/668; 361/669; 439/146; 439/167; 439/797
[58] Field of Search .................................. 439/146, 167, 439/463–466, 517, 721, 723, 797, 798; 361/668–670, 660–666

[56] References Cited

U.S. PATENT DOCUMENTS

| | | | |
|---|---|---|---|
| 2,120,575 | 6/1938 | Sachs | 361/669 |
| 2,154,310 | 4/1939 | Kinnard | 361/669 |
| 2,348,755 | 5/1944 | Reynolds et al. | 361/669 |
| 2,367,433 | 1/1945 | Road | 361/669 |
| 2,548,540 | 4/1951 | Lewis | 361/668 |
| 2,788,472 | 4/1957 | Road et al. | 439/517 |
| 3,061,763 | 10/1962 | Ekstrom . | |
| 3,183,408 | 5/1965 | Keller et al. | 361/668 |
| 3,221,216 | 11/1965 | Kobryner | 439/167 |
| 3,636,498 | 1/1972 | McQuarrie | 439/517 |
| 4,772,213 | 9/1988 | Bell et al. . | |
| 4,934,747 | 6/1990 | Langdon et al. . | |
| 5,181,166 | 1/1993 | Howell | 439/517 |
| 5,207,595 | 5/1993 | Learmont et al. . | |

*Primary Examiner*—Gary E. Elkins
*Attorney, Agent, or Firm*—Young & Basile, PC

[57] ABSTRACT

A watthour meter adapter includes jaw contacts for receiving blade terminals of a plug-in watthour meter. Apertures formed in an annular side wall of the adapter housing receive external line and load conductors therethrough. A terminal block disposed within the annular side wall at a lower portion of the housing receives the external line and load conductors as well as internal electrical conductors connected at opposite ends to the jaw contacts. A slot formed in a bottom wall of the housing receives a fastener to mount the housing to an external support surface. The terminal block and terminal connections as well as the mounting fastener are completely contained within and covered by a watthour meter when a watthour meter is mounted on the adapter.

14 Claims, 3 Drawing Sheets

WATTHOUR METER SOCKET ADAPTER FOR REPLACING AN OB WATTHOUR METER

BACKGROUND OF THE INVENTION

1. Field of the Invention

The present invention relates, in general, to watthour meters and, more specifically, to adapters for mounting a watthour meter to a support surface.

2. Description of the Art

Electrical watthour meters have long been used to measure the amount of electrical power consumed by an electrical utility customer. Watthour meters have been constructed in various configurations depending upon the type of electrical service that is required.

Older style watthour meters of the so-called bottom connected type are formed of a single piece housing containing internal power measurement elements, externally visible gages and bottom mounted terminals which provide connection between the external electrical utility power line conductors and the building load distribution network.

Several types of bottom-connected watthour meters are shown in FIG. 1. The upper three watthour meters are OB type watthour meters and have a relatively small current capability, such as ten amps. This results in a small overall exterior size for an OB watthour meter. The housing of an OB watthour meter includes a cylindrical portion containing the meter power measurement elements and the gages, and a bottom extending terminal portion containing internally mounted terminals which receive the line and load conductors. A terminal cover is removably mountable over the terminal portion to cover the terminal connections.

Although modern power requirements have resulted in larger amperage watthour meters, the smaller OB watthour meters still remain in use. FIG. 1 depicts a typical mounting arrangement of a plurality of OB watthour meters used, for example, in an apartment building. Due to the small size of the OB watthour meters, a plurality of OB watthour meters can be mounted on a wall or support surface in a vertical column in close proximity to each other.

When it becomes desirable or necessary to increase the amperage supplied to a particular distribution load, or to replace a failed OB watthour meter, a watthour meter having a higher current rating, such as a modern, plug-in type watthour meter is typically employed. However, such plug-in watthour meters, as depicted in the bottommost watthour meter in FIG. 1, have a considerably larger overall diameter and size than the smaller OB type watthour meters. In order to mount a plug-in watthour meter to the support surface, a watthour meter socket adapter, such as that shown in U.S. Pat. No. 5,207,595, assigned to the assignee of the present invention, is employed. This type of watthour meter provides bottom terminal connections in the same manner as in the OB type watthour meter.

However, the larger diameter of the watthour meter receiving portion of the socket adapter which is necessary to receive the larger diameter plug-in watthour meter, and the bottom extending terminal portion of the socket adapter which carries the terminal connections to the external line and load conductors is frequently too large to be easily installed between two spaced OB watthour meters in a vertical column.

Another problem encountered during replacement of an OB watthour meter results from the long length of service or age of such OB watthour meters. The line and load conductors connected to the OB watthour meter become brittle over long use such that any excessive movement or bending of such conductors to reattach the conductors to a new watthour meter or watthour meter socket adapter frequently results in breakage of the conductors or disintegration of the insulation on the conductors. This may pose a significant environmental problem since older style conductors frequently employed asbestos insulation.

Thus, it would be desirable to provide a watthour meter adapter which has a smaller overall outer dimensional shape than previously devised watthour meter adapters. It would also be desirable to provide such a watthour meter adapter which can be used to replace a bottom connected watthour meter with a modern plug-in watthour meter. It would also be desirable to provide such a watthour meter adapter which enables the existing line and load conductors to be reconnected to the terminals in the adapter without excessive bending or movement of such conductors.

SUMMARY OF THE INVENTION

The present invention is a watthour meter socket adapter which has a small overall outer dimensional shape to enable such an adapter to be mounted in a closely arranged vertical column of watthour meters.

The inventive adapter includes a housing having a bottom wall and an annular side wall extending from the bottom wall to an outer mounting flange. A plurality of jaw contacts are mounted on the bottom wall for receiving the blade terminals of a plug-in watthour meter in a snap-in electrical connection. Terminal connection means are disposed entirely within the annular side wall of the housing and located at the cover portion of the housing in a normal housing mounting position to receive external electrical line and load conductors which pass through apertures formed in the housing and, also, internal conductors connected to the jaw contacts in the housing.

Preferably, the terminal connection means comprises a terminal block disposed on the bottom wall of the housing adjacent the bottom portion of the annular side wall of the housing. A plurality of hollow, electrically conductive sleeves are mounted in the terminal block, each sleeve receiving one external line or load conductor and one internal conductor. Means are provided for securing one external line or load conductor and one internal conductor to each sleeve. Preferably, the securing means comprises aligned apertures formed in each sleeve and the terminal block. Fasteners are extendible through the aligned apertures to fixedly connect the internal conductor and one of the external line or load conductors to the sleeve and, thereby, in electrical connection with each other. One end of each sleeve in the terminal block is aligned with one of a plurality of apertures formed in the annular side wall of the housing which allows passage of an external line or load conductor therethrough.

Means are also provided in the housing for attaching the housing to an external support surface. Preferably, a slot, such as a keyhole slot, is formed in the bottom wall of the housing for engagement with a fastener mounted on and extending outward from an external support surface.

The watthour meter adapter of the present invention, by mounting the terminal block and terminal connections entirely within the confines of the annular side wall or the watthour meter receiving portion of the adapter housing, has an overall dimensional size slightly smaller than the diameter of a plug-in watthour meter. This enables the inventive adapter to be mounted in a vertical column on a support surface in close proximity with other watthour meter adapters or watthour meters.

The mounting of the terminal block and terminal connections entirely within the housing of the present adapter causes such terminal connections to be covered by the watthour meter when the watthour meter is mounted to the adapter. This eliminates the need for a separate terminal cover and terminal cover seal as required in most other types of socket adapters and lowers the cost of the present adapter while still providing a high level of security.

In addition, the formulation of the mounting slot in the bottom wall of the housing eliminates the need for an externally mounted hanger. Further, the connection of the slot to an external fastener extending from a support surface causes the fastener and the mounting slot to be covered by a watthour meter when the watthour meter is mounted in the adapter thereby increasing security by making unauthorized removal of the watthour meter and adapter more difficult.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENT

Figure 1:
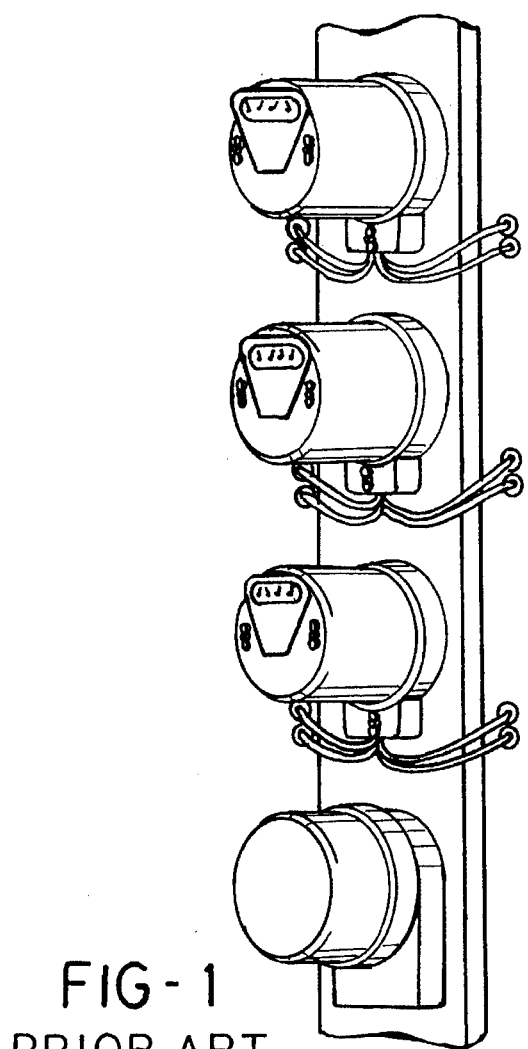
FIG. 1 is a perspective view of a prior art vertical column arrangement of OB type and plug-in type watthour meters.

Referring now to the drawing, and to FIGS. 2–5 in particular, there is depicted a watthour meter socket adapter 10 which is designed to removably receive a conventional plug-in watthour meter 12.

By way of background, the watthour meter 12 is of the conventional plug-in or socket type and has an external cover 14 which encloses the internal electrical power measurement mechanism and gages of the watthour meter 12. An annular mounting flange 16 extends radially outward from the base of the watthour meter 12 and provides a mounting connection to the adapter 10 as described hereafter.

A plurality of blade terminals 18 and 20 extend outward from the base of the watthour meter 12. The terminals 18 and 20 are provided in a predetermined number and arrangement depending upon the type of electrical service provided to a customer, i.e., single phase, three phase, etc. By way of example only, a pair of line blade terminals 18 and a pair of load blade terminals 20 are depicted in FIG. 2 for a single phase service, with only one blade terminal 18 and 20 of each pair of line and load blade terminals being depicted.

A sealing ring 22, also known as a clamp ring or collar, is used to sealingly attach the mounting flange 16 of the watthour meter 12 to a corresponding mounting flange on the adapter 10. The sealing ring 22 may take one of a number of different forms, such as the form shown in FIG. 2, which is described in greater detail in U.S. Pat. No. 4,934,747, assigned to the present assignee. A wire seal or plastic padlock, not shown, is used to seal the ends of the seal ring 22 in order to provide an indication of any unauthorized attempt to remove the watthour meter 12 from the adapter 10. Other types of seal rings, such as a high security seal ring including a barrel lock, which is sold by E. J. Brooks Company, model number 8490010, may also be employed with the socket adapter 10.

Figure 2:
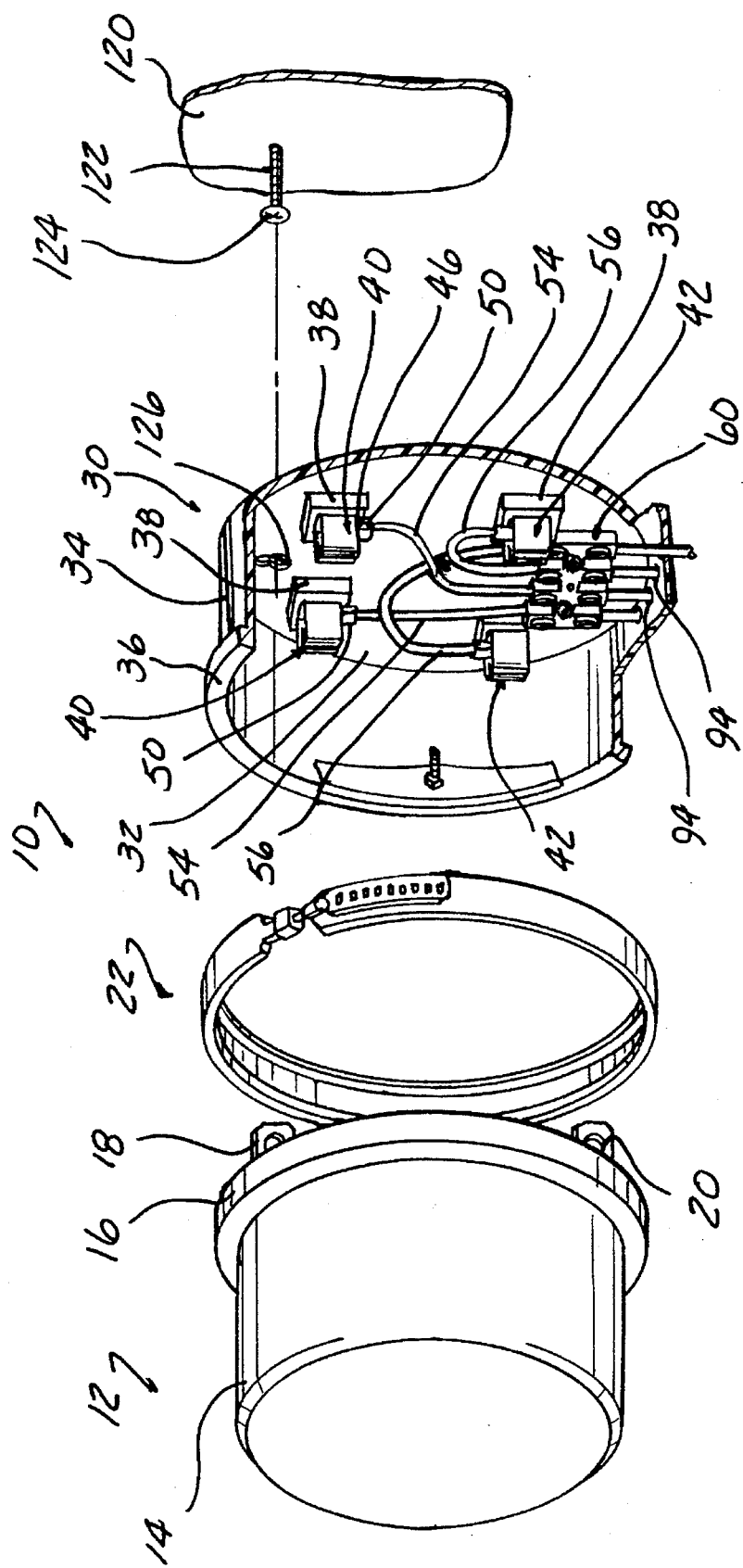
FIG. 2 is an exploded, perspective view of a watthour meter socket adapter of the present invention receiving a plug-in watthour meter and seal ring.
Figure 3:
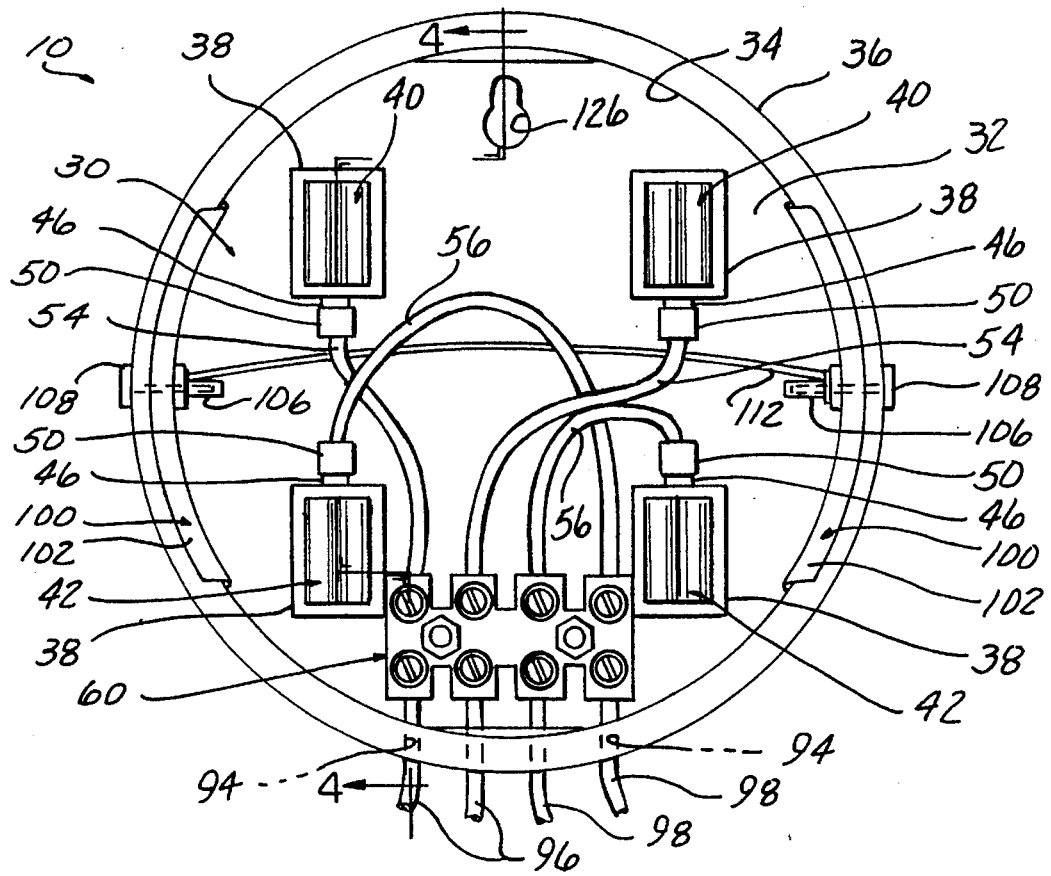
FIG. 3 is a front elevational view of the watthour meter socket adapter shown in FIG. 2.
Figure 4:
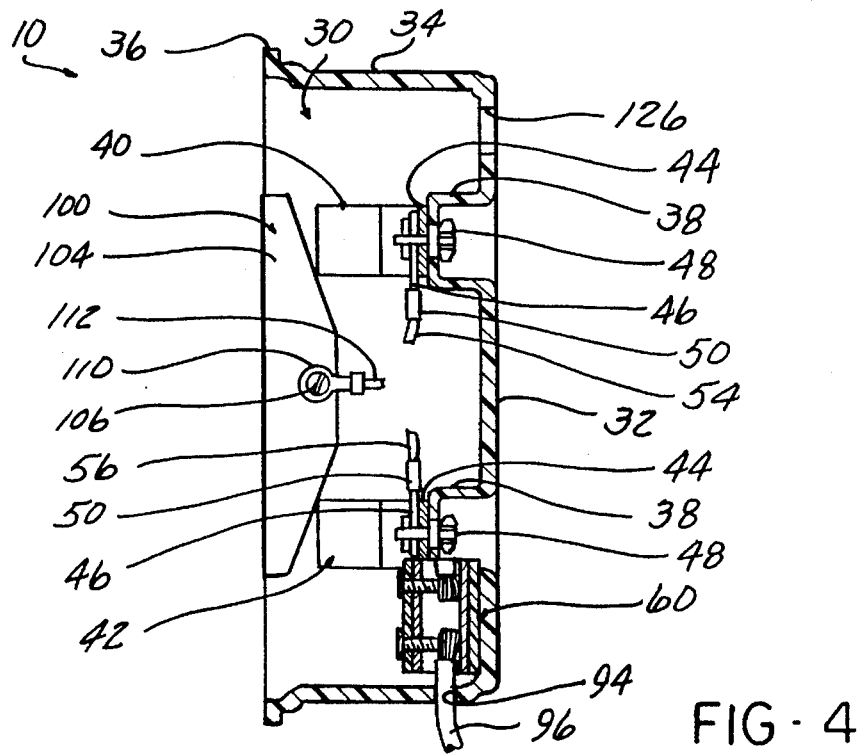
FIG. 4 is a cross sectional view generally taken along line 4—4 in FIG. 3.

As shown in FIG. 2, and in greater detail in FIGS. 3 and 4, the present watthour meter socket adapter 10 includes a housing denoted generally by reference number 30. The housing 30 is formed as an integral, one-piece unit with a base or bottom wall 32 and an annular side wall 34 extending integrally from the bottom wall 32 to a peripheral edge mounting flange 36. The flange 36 extends radially outward from one end of the annular side wall 34 and provides a mounting surface complementary to the mounting flange 16 on the watthour meter 12. When the mounting flange 16 on the watthour meter 12 is engaged with the mounting flange 36 on the adapter 10, the sealing ring 22 can be mounted about the edges of the mounting flanges 16 and 36 to sealingly join the watthour meter 12 to the adapter 10 in a conventional manner.

A plurality of raised mounting bosses 38 are integrally formed on and extend outward from the bottom wall 32. The bosses 38 provide a suitable mount for a pair of line jaw contacts 40 and a pair of load jaw contacts 42 in the single phase service of the exemplary embodiment of the present invention. The line jaw contacts 40 and the load jaw contacts 42 may have any conventional jaw contact form. By way of example only, the line jaw contacts 40 and the load jaw contacts 42 are illustrated as having a conventional folded-over shape provided by a unitary electrically conductive member having a central base 44, shown in FIG. 4, from which a pair of side walls extend. The outer ends of the side walls are folded over into close proximity with each other to form a separable opening for snugly receiving one of the blade terminals 18 and 20 on the watthour meter 12 in a snap-in electrical connection.

A terminal 46 is attached to the central wall 44 of each contact 40 and 42 by means of a threaded fastener 48 which extends through a slot in each mounting boss 38 and aligned apertures in the central wall 44 of each jaw contact 40 and 42 and the terminal 46. Suitable nuts are provided on opposite ends of the fastener 48 to secure each terminal 46 to the central wall 44 of the respective line jaw contact 40 and load jaw contact 42.

A conventional wire crimp 50 is formed on each terminal 46 for receiving one end of an electrical conductor. As shown more clearly in FIG. 3, a pair of internal electrical conductors 54 are disposed within the housing 30 and connected to the wire crimps 50 on the terminals 46 attached to the line jaw contacts 40. Each conductor 54 is contained completely within the housing 30 of the adapter 10 and extends to an opposite end connection in a terminal block means as described hereafter. Another pair of internal electrical conductors 56 are also disposed in the housing 30 and connected to the wire crimps 50 on the terminals 46 attached to the load jaw contacts 42.

Figure 6:
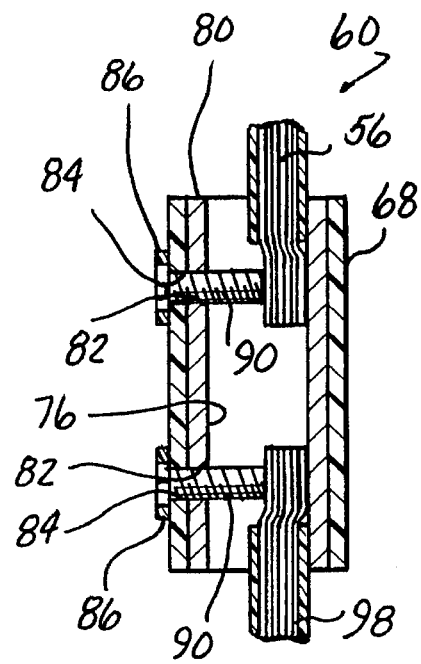
FIG. 6 is a cross sectional view generally taken along line 6—6 in FIG. 5.
Figure 5:
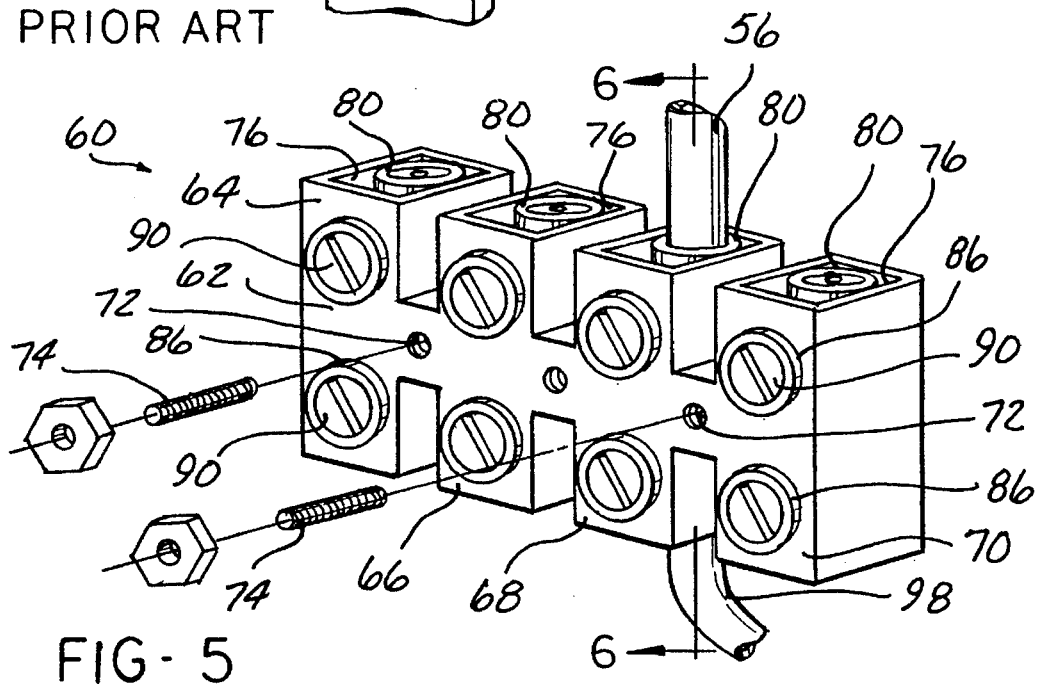
FIG. 5 is a perspective view of the terminal block mounted in the watthour meter socket adapter shown in FIGS. 2, 3 and 4.

According to a unique feature of the present invention, a terminal block means 60 shown generally in FIGS. 2, 3 and 4, and in greater detail in FIGS. 5 and 6, is contained entirely within the housing 30 of the adapter 10. The terminal block means or terminal block 60 is formed as a unitary, one-piece member of a suitable electrically insulating material. Although the terminal block 60 is described hereafter as a one-piece member removably mounted in the housing 30, the terminal block 60 can also be partially or completely integrally molded as a unitary part of the housing 30.

The terminal block 60 may take one of a number of different configurations. By way of example only, the terminal block 60 is formed with a central stem 62 from which projects a plurality of spaced legs 64, 66, 68 and 70, project with the opposed ends of each leg 64, 66, 68 and 70 extending outwardly from the stem 62.

A plurality of mounting bores 72 are formed in the stem 60 and receive suitable fasteners 74 which extend through the bores 72 and the bottom wall 32 of the housing 30 to securely mount the terminal block 60 on the bottom wall 32 of the housing 30.

Each of the legs 64, 66, 68 and 70 is formed with a through bore denoted generally by reference number 76. An electrically conductive, hollow sleeve 80 is mounted in the bore 76 of each leg 64, 66, 68 and 70. The sleeve 80 may have any suitable shaped such as a generally cylindrical, circular cross section shape as shown in FIGS. 5 and 6. Each sleeve 80 extends substantially through the entire length of each leg 64, 66, 68 and 70 in the terminal block 60 and has open ends for receiving electrical conductors as described hereafter. As shown in FIG. 6, each sleeve 80 includes at least one and preferably a pair of spaced apertures 82 which are aligned in the side wall of the sleeve 80 and extend transverse to the bore through each sleeve 80. The apertures 82 are alignable with corresponding apertures 84 formed at opposite ends of each leg 64, 66, 68 and 70 in the terminal block 60. Raised, annular lips 86 on the outer surface of each leg 64, 66, 68 and 70 act as guides for insertion of a terminal fastener into each aperture 84 as described hereafter.

A fastener 90, such as a threaded set screw, is threadingly insertable through the aligned apertures 84 and 82 in each leg 64, 66, 68 and 70 of the terminal block 60 and each conductive sleeve 80. The innermost ends of each fastener 90 engage the bare ends of an electrical conductor, as shown in FIG. 6, to securely fit the conductor in the sleeve 80 in contact with the conductive side wall of the sleeve 80.

As shown in FIG. 3, the terminal block 60 is disposed adjacent the bottom or lower portion of the housing 30 is in the depicted, conventional vertical mounting orientation of the housing 30. In this position, the conductive sleeves 80 in each of the legs 64, 66, 68 and 70 of the terminal block 60 are positioned to receive one end of the internal conductors 54 and 56. By way of example only, the conductive sleeves 80 in the legs 64 and 66 of the terminal block 60 receive the internal conductors 54 connected to the line jaw contacts 40. Similarly, the conductive sleeves 80 and the legs 68 and 70 of the terminal block 60 receive one end of the internal conductors 56 connected to the load jaw contacts 42.

As shown in FIGS. 2 and 3, the other end of each of the conductive sleeves 80 in the legs 64, 66, 68 and 70 of the terminal block 60 are positioned adjacent to and aligned with a plurality of apertures 94 formed in and extending through the annular side wall 34 of the housing 30. The apertures 94 allow the passage of a pair of line conductors 96 connected to the electrical utility power distribution network and a pair of load conductors 98 connected to the building load distribution network to each of the conductive sleeves 80 in the terminal block 60. This arrangement enables the external line conductors 96 to be electrically connected to the internal conductors 54 and to the line jaw contacts 40 in the housing 30. Similarly, the external load conductors 98 are electrically connected to the internal conductors 56 and to the load jaw contacts 42 in the housing 30. It should be noted that this arrangement places the line conductors 96 and 54 on the left end of the terminal block 60 in the orientation shown in FIG. 3 and the load conductors 98 and 56 on the right end of the terminal block 60 is the same line and load conductor arrangement as found in a conventional bottom connected watthour meter, as shown in FIG. 1. This eliminates excessive handling or bending of the external line and load conductors during installation of the adapter 10 which could lead to breakage of the conductors and/or disintegration of the conductor insulation.

The adapter 10 also includes a surge ground circuit which connects the ground tabs mounted on the outer surface of the base of the plug-in watthour meter 12 to a ground connection external from the adapter 10. Ground strips 100 are mounted on the side wall 34 of the housing 30, and have an edge portion 102 overlaying the exterior surface of the end mounting flange 36 and an inner portion 104 extending downwardly over the interior surface of the annular side wall 34.

The ground strips 100 are fixedly attached to the annular side wall 34. By way of example only, as shown in FIGS. 3 and 4, a tubular sleeve 106 is securely attached, such as by a rivet-type connection, through the ground strip 100 to the annular side wall 34. The sleeve 106 has an internal threaded bore which receives an external threaded fastener 108 after the fastener 108 passes through aligned apertures in the sidewall 34 of the housing 30 and the inner portion 104 of the ground strip 100. The fastener 108 provides a suitable external ground connection to the adapter 10. Further, an apertured eyelet 110 is mounted between the sleeve 106 and the ground strip 100 in electrical connection with the ground strip 100. A ground conductor 112 having eyelets 110 attached at opposite ends is connected to each tubular sleeve 106 on the opposed ground strips 100 to interconnect both ground strips 100 to an external ground connection via one or both of the fasteners 108.

The adapter 10 is also provided with a mounting means for securely mounting the adapter 10 to a support surface. Such a support surface 120 is shown in FIG. 2 and may be any support surface, such as a building wall or panel surface. A threaded fastener 122 is mounted in and extends outward from the support surface 120 and terminates in an enlarged head 124. A slot 126, preferably in the form of a keyhole slot having a narrow end and an opposed, enlarged, generally circular end, is formed in the bottom wall 32 of the adapter housing 30. The enlarged end of the slot 126 first receives the head 124 of the fastener 122, with the adapter 30 then being slid downward to bring the shaft of the fastener 122 into the narrow end of the slot 126. The fastener 122 is then securely tightened to fixedly mount the adapter 10 to the support surface 120.

In use, the adapter 10 is constructed as described above with the internal conductors 54 and 56 connected to and extending between the respective line and load jaw contacts 40 and 42 and the sleeves 80 in the terminal block 60. The adapter 10 is then mounted on a support surface 120 by first sliding the head 124 of the threaded fastener 122 on the support surface 120 through the enlarged end portion of the slot 126 in the bottom wall 32 of the adapter housing 30. The housing 30 is then slid downwardly to bring the shaft of the fastener 122 into engagement with the narrow end of the slot 122 in the bottom wall 32. The fastener 122 is then tightened to securely mount the adapter 10 on the support surface 120. It should be noted that through the use of the slot 126 formed on the bottom wall 32 of the housing 30, the fastener 122 used to fixedly mount the adapter 10 to the support surface 120 is covered by the watthour meter 12 when the watthour meter 12 is mounted on the adapter 10. This prevents any access to the fastener 122 in an unauthorized attempt to remove the adapter 10 from the support surface 120.

Next, the line and load conductors 96 and 98 are brought through the apertures 94 in the side wall 34 of the housing 30 and securely connected to the respective sleeve 80 in the terminal block 60. The mounting flange 16 of the watthour meter 12 is then engaged with the mounting flange 36 on the adapter 10 before the sealing ring 22 is joined about the mating mounting flanges 16 and 36 to sealingly attach the watthour meter 12 to the adapter 10.

The watthour meter adapter of the present invention provides several advantages not previously provided in a watthour meter adapter. In the inventive adapter, the terminal block providing terminal connections between external line and load conductors and internal conductors extending to the line and load jaw contacts in the adapter housing is disposed completely within and adjacent the bottom portion of the annular watthour meter receiving side wall of the adapter housing. This minimizes the overall exterior dimensions of the adapter thereby enabling its use in multiple watthour meter or adapter column mounting arrangements. Further, the mounting of the terminal block connections entirely within the housing eliminates the need for a separate terminal cover and seal or lock as is required in most watthour meter socket adapters. This provides additional security since the terminal connections are covered by the watthour meter when the watthour meter is mounted on the socket adapter. Finally, the mounting of the terminal block at a bottom portion of the adapter housing provides the line and load conductor terminal connections in the same positions as found on bottom connected watthour meters. This eliminates excessive handling or bending of the line and load conductors which could cause breakage of the conductors due to their brittleness as well as disintegration of the electrical insulation on the conductors.

What is claimed is:

1. A watthour meter adapter for a watthour meter having a peripheral mounting flange and a plurality of outwardly extending blade terminals, the watthour meter adapter comprising:

a housing having a bottom wall and an annular side wall extending from the bottom wall to an end mounting flange;

a plurality of jaw contacts mounted on the bottom wall for receiving blade terminals of a watthour meter in a snap-in connection; and terminal block means, disposed within the peripheral confines of the annular side wall of the housing, for receiving external line and load conductors and internal conductors connected to the jaw contacts.

2. The watthour meter adapter of claim 1 further comprising:

apertures formed in the side wall of the housing for passage of the external line and load conductors therethrough to the terminal block means.

3. The watthour meter adapter of claim 2 wherein in a normal mounting position of the housing, the external line conductors are connected to the leftmost end of the terminal block means and the external load conductors are connected to the rightmost end of the terminal block means.

4. A watthour meter adapter for a watthour meter having a peripheral mounting flange and a plurality of outwardly extending blade terminals, the watthour meter adapter comprising:

a housing having a bottom wall and an annular side wall extending from the bottom wall to an end mounting flange;

a plurality of jaw contacts mounted on the bottom wall for receiving blade terminals of a watthour meter in a snap-in connection; and terminal block means, disposed within the housing and located at a lower portion of the housing, for receiving external line and load conductors and internal conductors connected to the law contacts the terminal block means including:

a terminal block mounted on a lower portion of the bottom wall of the housing within the peripheral confines of the annular side wall; and terminal connection means, mounted in the terminal block, for receiving and electrically connecting one external line and load conductor to one internal conductor.

5. The watthour meter adapter of claim 4 wherein the terminal connection means comprises:

a plurality of hollows electrically conductive sleeves mounted in the terminal block; and means for securing one external line and load conductor and one internal conductor to each sleeve.

6. The watthour meter adapter of claim 5 wherein the securing means comprises:

aligned apertures formed in each sleeve and the terminal block; and fasteners extendible through the aligned apertures into engagement with one of the internal conductors and one of the external line and load conductors to electrically connect the one internal conductor and the one external line and load conductor to the conductive sleeve.

7. The watthour meter adapter of claim 5 further comprising:

apertures formed in the side wall of the housing for passage of the external line and load conductors therethrough to the terminal block means; and one end of each conductive sleeve aligned with one aperture formed in the annular side wall of the housing to receive one of the external line and load conductors therethrough.

8. The watthour meter adapter of claim 1 further comprising:

means, formed in the housing, for attaching the housing to a support surface.

9. The watthour meter adapter of claim 8 wherein the attaching means comprises:

a threaded fastener mounted on and extending outward from an external support surface; and slot means, formed in the bottom wall of the housing, for receiving the fastener to mount the housing to the support surface through tightening of the fastener.

10. A watthour meter adapter for a watthour meter having a peripheral mounting flange and a plurality of outwardly extending blade terminals, the watthour meter adapter comprising:

a housing having a bottom wall and an annular side wall extending from the bottom wall to an end mounting flange;

a plurality of jaw contacts mounted on the bottom wall for receiving blade terminals of a watthour meter in a snap-in connection;

apertures formed in the side wall of the housing for passage of external line and load conductors therethrough;

an electrically insulated terminal block disposed on a lower portion of the bottom wall of the housing within the peripheral confines of the annular side wall of the housing;

a plurality of hollow electrically conductive sleeves mounted in the terminal block, each sleeve receiving one external line and load conductor and one internal conductor;

one end of each conductive sleeve aligned with one aperture formed in the annular side wall of the housing to receive one of the external line and load conductors therethrough;

aligned apertures formed in each sleeve and the terminal block; and fasteners extendible through the aligned apertures into engagement with one of the internal conductors and one of the external line and load conductors to electrically connect one internal conductor and one external line and load conductor to the conductive sleeve.

11. The watthour meter adapter of claim 10 further comprising:

means, formed in the housing, for attaching the housing to a support surface.

12. The watthour meter socket adapter of claim 11 wherein the attaching means comprises:

a threaded fastener mounted on and extending outward from an external support surface; and slot means, formed in the bottom wall of the housing, for receiving the fastener to mount the housing to the support surface through tightening of the fastener.

13. A watthour meter adapter for a watthour meter having a peripheral mounting flange and a plurality of outwardly extending blade terminals, the watthour meter adapter comprising:

a housing having a bottom wall and an annular side wall extending from the bottom wall to an end mounting flange;

a plurality of jaw contacts mounted on the bottom wall for receiving blade terminals of a watthour meter in a snap-in connection;

a plurality of internal electrical conductors disposed in the housing, each internal electrical conductor having first and second ends, the first end respectively connected to one of the jaw contacts; and terminal connector means, disposed completely within the annular side wall at a lower portion of the housing, for connecting each internal conductor to one external line and load conductor, the terminal connector means disposed between the annular side wall and the bottom wall of the housing and a watthour meter when a watthour meter is mounted on the housing.

14. The watthour meter socket adapter of claim 12 further comprising:

means, disposed entirely within the housing when a watthour meter is mounted on the housing, for attaching the housing to an external fastener extendibly mounted on an external support surface.

* * * * *